United States Patent [19]
Yoshino

[11] Patent Number: 5,673,033
[45] Date of Patent: Sep. 30, 1997

[54] IMAGE COMMUNICATION APPARATUS

[75] Inventor: Motoaki Yoshino, Kawasaki, Japan

[73] Assignee: Canon Kabushiki Kaisha, Tokyo, Japan

[21] Appl. No.: 363,581

[22] Filed: Dec. 23, 1994

Related U.S. Application Data

[63] Continuation of Ser. No. 862,439, Apr. 2, 1992, abandoned.

[30] Foreign Application Priority Data

Apr. 4, 1991 [JP] Japan ................... 3-71318

[51] Int. Cl.$^6$ .................................................. H04Q 1/00
[52] U.S. Cl. .................. 340/825.52; 358/437; 375/377; 379/100
[58] Field of Search ................... 340/825.52; 379/93, 379/100; 358/402, 403, 404, 440, 437; 370/84, 79; 375/8, 121, 122, 13, 222, 377

[56] References Cited

U.S. PATENT DOCUMENTS

| | | | |
|---|---|---|---|
| 4,680,773 | 7/1987 | Amundson | 375/8 |
| 4,807,276 | 2/1989 | Okabe | 379/93 |
| 4,845,569 | 7/1989 | Kurahayashi . | |
| 4,878,123 | 10/1989 | Miura . | |
| 4,994,926 | 2/1991 | Gordon | 358/440 |
| 5,111,307 | 5/1992 | Yoshino . | |
| 5,200,992 | 4/1993 | Yoshino | 379/93 |
| 5,241,565 | 8/1993 | Kloc | 375/8 |

*Primary Examiner*—Brian Zimmerman
*Attorney, Agent, or Firm*—Fitzpatrick, Cella, Harper & Scinto

[57] ABSTRACT

An image communication apparatus for storing a plurality of image data to be transmitted, respectively, in correspondence with identification data of destination stations, and sequentially transmitting the stored image data to corresponding destination stations, includes a first determining unit for determining validity of a communication speed, a second determining unit for determining whether additional data to be transmitted to a given destination station are present at the time of transmission of image data to the given destination station, and a controller for transmitting all the additional data to be transmitted to the given destination station without disconnecting a line when the second determining means determines that the additional data to be transmitted to the given destination station are present and the first determining means determines that a valid communication speed is currently used.

24 Claims, 3 Drawing Sheets

IMAGE COMMUNICATION APPARATUS

This application is a continuation of application Ser. No. 07/862,439, filed Apr. 2, 1992, now abandoned.

BACKGROUND OF THE INVENTION

1. Field of the Invention

The present invention relates to an image communication apparatus and, more particularly, to an image communication apparatus for transmitting image data after the image data to be transmitted is stored in a memory.

2. Related Background Art

A conventional facsimile is known in which a large-capacity memory is incorporated or an external memory device such as a magnetic disk is arranged, target transmission image data to be sent to a plurality of destination stations is read and stored, and the plurality of destination stations are sequentially called to transmit an image.

In such a system for storing a transmission image for a plurality of destination stations in an image memory, a telephone number (tel number) of each destination station and image data are stored as a data block, and each block is called and transmitted at the time of image transmission.

In a conventional apparatus, the line is disconnected every time one data block is transmitted, and a call is made using the telephone number of the next data block to transmit the next image data. For this reason, if transmission reservation is made for the same destination station, plural times, (i.e., the read of image data and the input of the telephone number in advance), the line is desconnected between the transmissions of two adjacent data blocks although the read and input operations for the data blocks have been continuously performed. In transmission of the second and subsequent data blocks, the call operation is repeated from the beginning, resulting in inconvenience.

This problem is also posed when a transmission reservation is made for a given destination station during transmission of image data to this destination station. Under this control, communication expenses are undesirably increased when a communication fee within a predetermined period of time is constant, i.e., when local calls are to be made.

In order to solve the above problem, the present applicant proposed the following arrangement in U.S. Ser. No. 663, 198 filed on Feb. 28, 1991. This arrangement includes a communicating means for determining whether additional image data for a given destination station are stored at the time of transmission of image data to the given destination station. If such additional image data are stored, they can be transmitted to the given destination station without disconnecting the line.

A facsimile apparatus incorporating the above prior-art invention still poses the following problems.

(1) When the facsimile apparatus is accidentally connected to a line having poor quality for a call connection for transmitting the first image data, the message transmission speed may be less than a maximum communication speed between the source and destination stations as a result of a pre-procedure. If image data transmission continues, the communication expenses are undesirably increased against the object to be solved by the present invention.

(2) When the message transmission speed falls back to be less than the maximum communication speed due to degradation of line quality during communication and the influence of noise superposition, and the subsequent image data is kept transmitted, the communication expenses are undesirably increased.

SUMMARY OF THE INVENTION

It is an object of the present invention to improve an image communication apparatus in consideration of the conventional problems described above.

It is another object of the present invention to provide an image communication apparatus capable of transmitting a plurality of image data to the same destination station without being adversely affected by quality of a line connected to the apparatus or deterioration over time thereof.

The above and other objects, features, and advantages of the present invention will be apparent from the detailed description of a preferred embodiment in conjunction with the accompanying drawings.

DETAILED DESCRIPTION OF THE PREFERRED EMBODIMENT

A preferred embodiment of the present invention will be described in detail with reference to the accompanying drawings.

Figure 1:
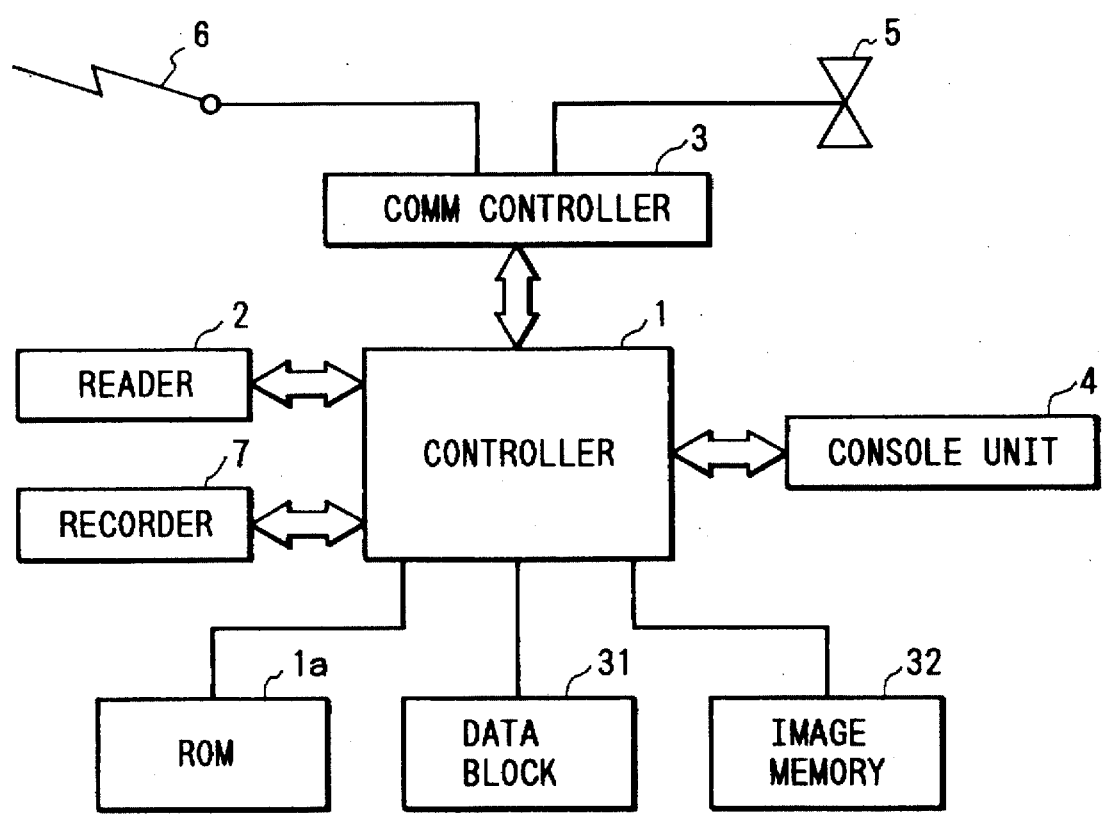
FIG. 1 is a block diagram showing an arrangement of a facsimile apparatus according to an embodiment of the present invention.

FIG. 1 is a block diagram showing an arrangement of a facsimile apparatus of this embodiment. A controller 1 for controlling the operation of the overall apparatus comprises a microprocessor element and the like. The controller 1 is connected to each memory means and respective components to be controlled (to be described in detail later) through a data bus and an address bus.

The controller 1 is connected to a ROM 1a for storing a program (to be described later) and constants required to control the apparatus.

Original image data is read by a reader 2 constituted by a CCD sensor, an original feed system, and the like. Received image data or image data read by the reader 2 during copying is recorded by a recorder 7 constituted by a thermal printer, an ink-jet printer, or a laser beam printer.

Reception and transmission of image data and a procedure signal from and to a line 6 are performed through a communication controller (COMM CONTROLLER) 3. The communication controller 3 includes a modem for modulating/demodulating an image signal and a procedure signal, an NCU for controlling a line connection with a line control telephone set (or handset) 5 and maintaining a loop, and the like.

Communication operations are controlled by the controller 1 in accordance with operations and inputs at a console unit 4. The console unit 4 comprises a keyboard such as a ten-key pad and a display such as an LCD.

The control system shown in FIG. 1 includes memories 31 and 32. The memories 31 and 32 comprise programmable memories such as RAMs and magnetic disks.

The data block 31 stores, in units of blocks, data pointers for image data stored in the image memory 32. The image memory 32 actually stores image data. These memories are illustrated in two blocks but may be actually allocated in a linear memory space.

Figure 2:
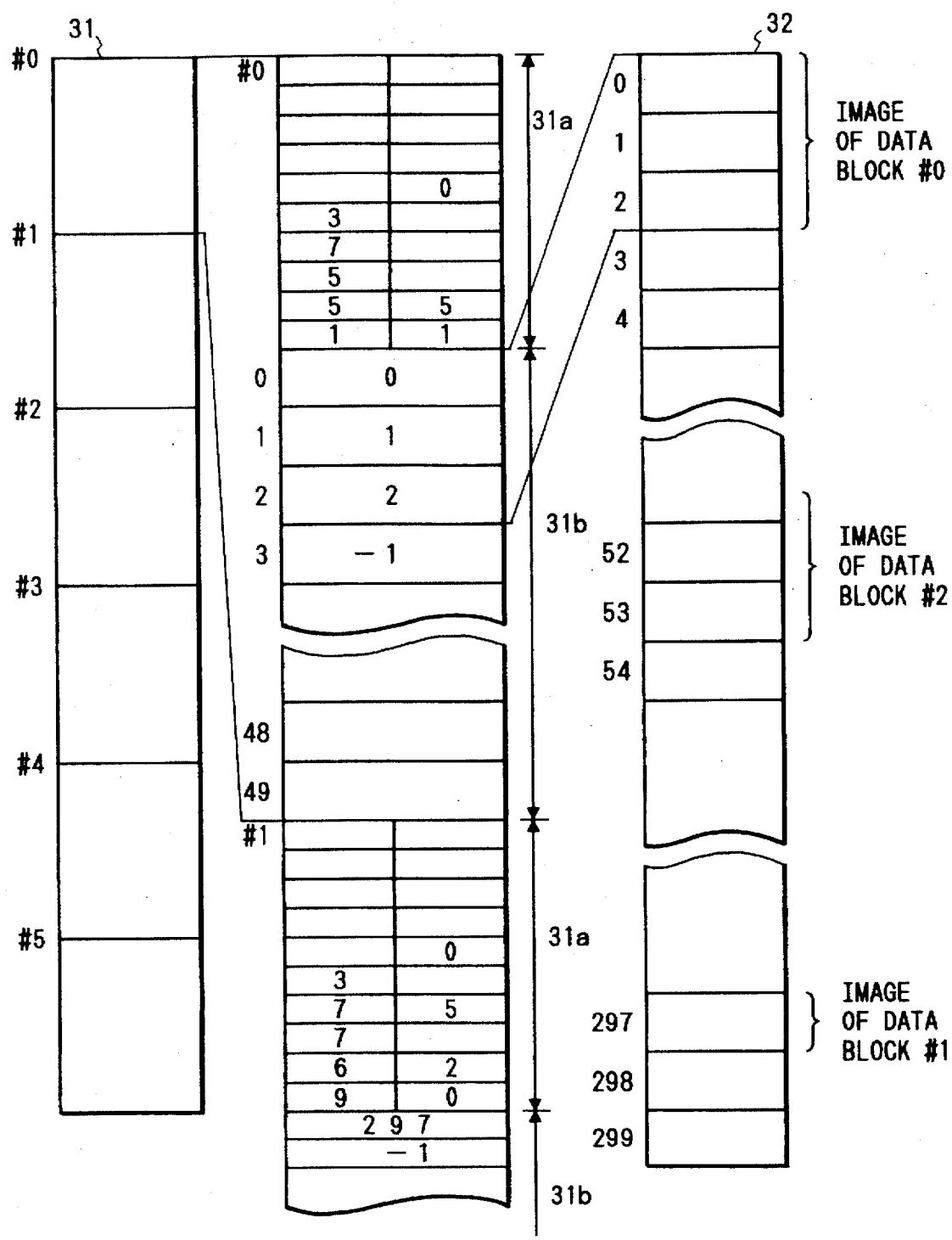
FIG. 2 is a view showing structures of transmission data blocks and an image memory.

FIG. 2 shows data structures of the data block 31 and the image memory 32.

On the left side of FIG. 2, the data block 31 comprises six blocks #0 to #5. Block #0 is a transmission execution block. When transmission is designated, image data pointed by a register in block #0 is transmitted. Blocks #1 to #5 are transmission reservation blocks. When the contents of block #0 are transmitted, the contents of blocks #1 to #5 are sequentially transferred to execution block #0 and are transmitted.

The structures of blocks #0 and #1 are shown at the center of FIG. 2.

The image memory 32 comprises a page memory arranged in units of pages capable of sufficiently storing image data in, e.g., an A4 size. The image memory 32 has a storage area of 300 pages, i.e., page 0 to page 299.

As shown at the center of FIG. 2, a telephone number register 31a for storing a 20-digit destination station telephone number is arranged at the beginning of transmission data block #0. A page register 31b for storing pointers (image memory addresses) for pointing pages 0 to 299 of the image memory 32 follows the telephone number register 31a. Data "012" is stored at the beginning of the page register 31b and indicates page 012 of the image memory 32.

An operation of the above arrangement will be described with reference to a flow chart in FIG. 3. For the sake of descriptive simplicity, all images stored in the image memory 32 have the same scanning line length and the same scanning line density. A mode change signal (EOM signal) is not sent out as a post-message procedure signal (Q-signal).

Prior to transmission, when known transmission reservation operations are performed, that is, when predetermined operations are performed at the console unit 4 to input a telephone number and start the apparatus, image data are read by the reader 2. The read image data are sequentially stored in empty areas of the image memory 32. Telephone number data and page pointing data are sequentially stored in blocks #0 to #5 of the transmission data block 31.

When the line 6 is accessed, the controller 1 sequentially performs a call and transmission in accordance with the contents stored in the transmission data block 31.

In order to transmit block #0, dialing of a number stored in the telephone number register 31a of block #0 is set in step S1.

In step S2, a transmission page pointer PP (pointing 0 to 49 of block #0 at the center in FIG. 2) is set to be "0".

In step S3, a communication pre-procedure (a phase B pre-message procedure) is performed for initial identification on the basis of the CCITT recommendation T30. At this time, a smaller one (i.e., a maximum communication speed which can be used between the connected destination station and the facsimile apparatus) of a maximum communication speed of a destination terminal declared by a received DIS (Digital Identification Signal) and a maximum communication speed of the facsimile apparatus is stored in a register MAXspd.

When the predetermined pre-procedure is completed, a communication speed capable of causing the facsimile apparatus to communicate with the destination station is determined. At this time, a communication speed is selected from the maximum communication speed (that stored in the register MAXspd), and known training is performed. The communication speed is selected such that a lower speed is selected (fall-back), upon a training failure and a communication speed upon success of training is used as the communication speed for actually transmitting a message (image).

When message transmission is enabled, the selected transmission speed is stored in a register Txspd.

The speeds stored in the registers MAXspd and Txspd are equal to each other (MAXspd=Txspd) if the maximum speed can be used. Once fall-back occurs due to poor quality of the line, condition MAXspd>Txspd is established.

The registers MAXspd and Txspd are constituted by registers of the controller 1 or a RAM.

In step S4, image data stored in a page ("012" in this case) of the image memory 32 which is indicated by the register (0 to 49) in the page register 31b pointed by the transmission page pointer PP is transmitted.

In step S5, the transmission page pointer PP is incremented by one, and the flow advances to step S6. The contents of the register in the page register 31b pointed by the pointer PP are read out. It is determined in step S7 whether the readout data is −1.

If NO in step S7, pages to be transmitted are still left in block #0, and the flow advances to step S8 to output an MPS (MultiPage Signal). The flow returns to step S3 or S4 in accordance with a determination result (i.e., presence/absence of reception of an MCF signal) of a response signal in step S9. Transmission of block #0 is continued.

If the value determined in step S7 is −1, all the pages of block #0 have been transmitted. The flow advances to step S10 to determine whether the same destination (the same telephone number) as in telephone number register #0 is stored in blocks #1 to #5 of the transmission data block 31.

If the same destination is not present, the flow advances to step S16. An EOP (End of Procedure) signal is sent out and its response signal is then received. The line is then disconnected to end communication processing.

If the same destination is present, the flow advances to step S11 to determine whether the present communication speed Txspd is equal to the maximum communication speed MAXspd between both the source and destination stations (comparison between the values in the registers MAXspd and Txspd).

If condition Txspd<MAXspd is established, the communication speed is determined to be decreased due to a line trouble. If the same destination is not present, the flow advances to step S16 to output an EOP signal and receives its response signal. The line is then disconnected to complete communication processing.

If condition Txspd=MAXspd is established, a decrease in communication speed by a line trouble or the like is not detected, and the flow advances to step S12. The transmission reservation data block (#1 in FIG. 2) for the same destination is transferred to execution data block #0. The transmission page pointer PP is reset to "0" in step S13, and the flow advances to step S14 to output an MPS signal. The flow returns to step S3 or S4 in accordance with a determination result of the response signal in step S15. Transmission of block #0 is continued.

In the above arrangement, if additional image data for the same destination station are stored, all the image data can be transmitted to the destination without disconnecting the line.

At this time, the maximum communication speed between the source and destination stations is compared with the currently used communication speed to determine whether a decrease in communication line by a line trouble occurs. If no decrease in communication speed by a line trouble occurs, all the remaining image data are transmitted. Even if a line having poor quality is accessed, transmission having poor efficiency is not continued. In this case, the line is disconnected, a line is connected again for the same destination station, and image data can be transmitted. A line state can be improved, and operation efficiency using this kind of communication apparatus can be improved. In addition, the communication expenses can be reliably decreased.

Figure 3:
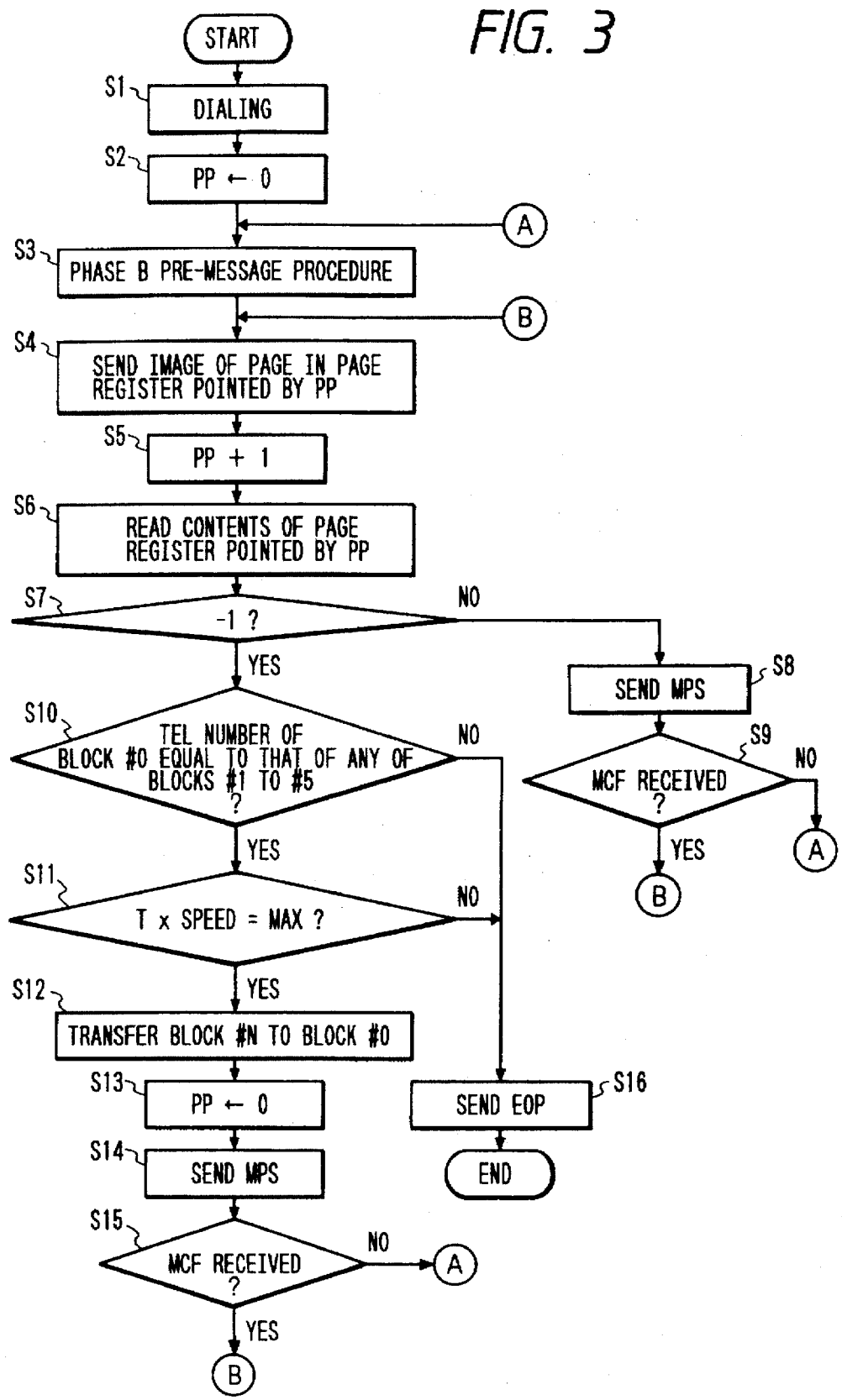
FIG. 3 is a flow chart showing a control operation of this embodiment.

In this embodiment, as a condition for determining whether transmission of the next block image is continued in step S11 of the flow chart in FIG. 3, a condition for determining whether the current communication speed Txspd is equal to the maximum communication speed MAXspd between the source and destination stations is set. In the above arrangement, once fall-back occurs, the line is disconnected.

Even if fall-back occurs once, some users may allow it. If quality degradation occurs such that constant slight fall-back occurs in the line between source and destination stations, an advantage of continuous transmission cannot be enjoyed.

Under the circumstances, a minimum communication speed which can be allowed by a user can be set. For example, an allowable minimum communication speed SETspd can be set at the console unit 4 beforehand.

The following conditional determination is performed from step S11 in FIG. 3. At this time, different operations are performed upon comparison between the speeds SETspd and MAXspd.

---

1) If SETspd < MAXspd,
 If Txspd < SETspd, then communication is ended (to step S16).
 If Txspd ≥ SETspd, then communication is continued (to step S12).
2) If SETspd ≥ MAXspd,
 If Txspd < MAXspd, then communication is ended (to step S16).
 If Txspd ≥ MAXspd, then communication is continued (to step S12).

---

In condition 1), if the actual communication speed Txspd is higher than the minimum speed SETspd set by the user, the communication can be continued. In condition 2), since comparison between Txspd and SETspd is meaningless, control as in the above embodiment is performed.

The present invention is not limited to the particular embodiment described above. Various changes and modifications can be made within the spirit and scope of the invention.

What is claimed is:

1. An image communication apparatus for storing a plurality of transmission blocks of image data in advance, each transmission block having a respective destination station identified by identification data respectively stored in said apparatus for each transmission block, said apparatus sequentially transmitting the stored transmission blocks to the respective destination stations, said apparatus comprising:

discrimination means for discriminating whether or not a communication speed used at an end of transmission of a first transmission block over a line connected to the respective destination station is less than a set speed, and control means for selectively performing disconnection of the line when the communication speed is less than the set speed or transmission of a second transmission block successively to the same destination station after the first transmission block without disconnecting the line when the communication speed is not less than the set speed, in accordance with a discrimination result of said discrimination means, the second transmission block being different from the first transmission block and having the same respective destination station.

2. An apparatus according to claim 1, wherein the set speed is a maximum communication speed between said apparatus and the destination station, so that said control means transmits the second transmission block successively after the first transmission block without disconnecting the line if the communication speed discriminated by said discrimination means is the maximum communication speed between said apparatus and the destination station, and disconnects the line if the discriminated communication speed is not the maximum communication speed between said apparatus and the destination station.

3. An apparatus according to claim 1, further comprising operating means for manually setting the set speed at a communication speed value, so that said control means transmits the second transmission block successively after the first transmission block without disconnecting the line if the communication speed discriminated by said discrimination means is equal to or greater than the communication speed value set by a user with said operating means, and disconnects the line if the discriminated communication speed is less than the communication speed value set by the user with said operating means.

4. An apparatus according to claim 1, wherein said control means disconnects the line after transmission of the first transmission block if there is no stored second transmission block having the same destination station as the first transmission block.

5. A method of storing, in a transmitting apparatus, a plurality of transmission blocks of image data in advance, each transmission block having a respective destination station identified by respectively stored identification data for each transmission block, said method sequentially transmitting the stored transmission blocks to the respective destination stations, said method comprising the steps of:

discriminating whether or not a communication speed used at an end of transmission of a first transmission block over a line connected to the respective destination station is less than a set speed, and conducting a control to selectively perform disconnection of the line when the communication speed is less than the set speed or transmission of a second transmission block successively to the same destination station after the first transmission block without disconnecting the line when the communication speed is not less than the set speed, in accordance with a discrimination result in the discrimination step, said second transmission block being different from the first transmission block and having the same destination station.

6. A method according to claim 5, wherein the set speed is a maximum communication speed between the transmitting apparatus and the destination station, so that in said control step, the second transmission block is transmitted successively after the first transmission block without disconnecting the line if the communication speed discriminated in said discrimination step is the maximum communication speed between the transmitting apparatus and the destination station, and the line is disconnected if the discriminated communication speed is not the maximum communication speed between the transmitting apparatus and the destination station.

7. A method according to claim 5, further comprising an operating step for manually setting the set speed as a communication speed value, so that said control step transmits the second transmission block successively after the first transmission block without disconnecting the line if the communication speed discriminated by said discriminating step is equal to or greater than the communication speed value set by a user with said operating step, and disconnects the line if the discriminated communication speed is less than the communication speed value set by the user with said operating step.

8. A method according to claim 5, wherein in said control step, the line is disconnected after transmission of the first transmission block if there is no stored second transmission block having the same destination station as the first transmission block.

9. An image communication apparatus for storing a plurality of transmission blocks of image data in advance, each transmission block having a respective destination station identified by identification data respectively stored in said apparatus for each transmission block, said apparatus sequentially transmitting the stored transmission blocks to the respective destination stations, said apparatus comprising:

discrimination means for discriminating whether or not a communication speed used at an end of transmission of a first transmission block over a line connected to the respective destination station is less than a set speed; and control means for selectively performing disconnection of the line regardless of success of transmission of the first transmission block when the communication speed is less than the set speed or transmission of a second transmission block successively after the first transmission block to the same destination station without disconnecting the line when the communication speed is less than the set speed, in accordance with a discrimination result of said discrimination means.

10. An apparatus according to claim 9, wherein the set speed is a maximum communication speed between said apparatus and the destination station, so that said control means transmits the second transmission block successively after the first transmission block without disconnecting the line if the communication speed discriminated by said discrimination means is the maximum communication speed between said apparatus and the destination station, and disconnects the line if the discriminated communication speed is not the maximum communication speed between said apparatus and the destination station.

11. An apparatus according to claim 9, further comprising operating means for manually setting the set speed at a communication speed value, so that said control means transmits the second transmission block successively after the first transmission block without disconnecting the line if the communication speed discriminated by said discrimination means is equal to or greater than the communication speed value set by a user with said operating means, and disconnects the line if the discriminated communication speed is less than the communication speed value set by the user with said operating means.

12. An apparatus according to claim 9, wherein said control means disconnects the line after transmission of the first transmission block if there is no stored second transmission block having the same destination station as the first transmission block.

13. A method of storing, in an image communication apparatus, storing a plurality of transmission blocks of image data in advance, each transmission block having a respective destination station identified by identification data respectively stored in the apparatus for each transmission block, said method sequentially transmitting the stored transmission blocks to the respective destination stations, said method comprising the steps of:

calling the destination using calling means, discriminating whether or not a communication speed used at an end of transmission of a first transmission block over a line connected to the respective destination station is less than a set speed, and conducting a control to selectively perform disconnection of the line when the communication speed is less than the set speed or transmission of a second transmission block successively to the same destination station after the first transmission block without disconnecting the line when the communication speed is not less than the set speed, in accordance with a discrimination result of said discrimination means, the second transmission block being different from the first transmission block and having the same respective destination station, wherein said control step causes the calling means to call the destination again after disconnection of the line so as to transmit the second transmission block.

14. A method according to claim 13, wherein the set speed is a maximum communication speed between the apparatus and the destination station, so that said control step transmits the second transmission block successively after the first transmission block without disconnecting the line if the communication speed discriminated by said discriminating step is the maximum communication speed between said apparatus and the destination station, and disconnects the line if the discriminated communication speed is not the maximum communication speed between the apparatus and the destination station.

15. A method according to claim 13, further comprising an operating step for manually setting the set speed at a communication speed value, so that said control step transmits the second transmission block successively after the first transmission block without disconnecting the line if the communication speed discriminated by said discriminating step is equal to or greater than the communication speed value set by a user with in operating step, and disconnects the line if the discriminated communication speed is less than the communication speed value set by the user in said operating step.

16. A method according to claim 13, wherein said control step disconnects the line after transmission of the first transmission block if there is no stored second transmission block having the same destination station as the first transmission block.

17. A method for storing, in a transmitting apparatus, a plurality of transmission blocks of image data in advance, each transmission block having a respective destination station identified by respectively stored identification data for each transmission block, said method sequentially transmitting the stored transmission blocks to the respective destination stations, said method comprising the steps of:

discriminating whether or not a communication speed used at an end of transmission of a first transmission block over a line connected to the respective destination station is less than a set speed; and conducting a control to selectively disconnect the line regardless of success of transmission of the first transmission block when the communication speed is less than the set speed or transmission of a second transmission block successively after the first transmission block to the same destination station without disconnecting the line when the communication speed is not less than the set speed, in accordance with a discrimination result of said discrimination step.

18. A method according to claim 17, wherein the set speed is a maximum communication speed between the transmitting apparatus and the destination station, so that in said control step, the second transmission block is transmitted successively after the first transmission block without disconnecting the line if the communication speed discriminated in said discrimination step is the maximum communication speed between the transmitting apparatus and the destination station, and the line is disconnected if the discriminated communication speed is not the maximum communication speed between the transmitting apparatus and the destination station.

19. A method according to claim 17, further comprising an operating step for manually setting the set speed as a communication speed value, and wherein said control step transmits the second transmission block successively after the first transmission block without disconnecting the line if the communication speed discriminated by said discriminating step is equal to or greater than the communication speed value set by a user with said operating step, and disconnects the line if the discriminated communication speed is less than the communication speed value set by the user with said operating step.

20. A method according to claim 17, wherein said control step disconnects the line after transmission of the first transmission block if there is no stored second transmission block having the same destination station as the first transmission block.

21. An image communication apparatus for storing a plurality of transmission blocks of image data in advance, each transmission block having a respective destination station identified by identification data respectively stored in said apparatus for each transmission block, said apparatus sequentially transmitting the stored transmission blocks to the respective destination stations, said apparatus comprising:

calling means for calling the destination, discrimination means for discriminating whether or not a communication speed used at an end of transmission of a first transmission block over a line connected to the respective destination station is less than a set speed, and control means for selectively performing disconnection of the line when the communication speed is less than the set speed or transmission of a second transmission block successively to the same destination station after the first transmission block without disconnecting the line when the communication speed is not less than the set speed, in accordance with a discrimination result of said discrimination means, the second transmission block being different from the first transmission block and having the same respective destination station, wherein said control means causes said calling means to call the destination again after disconnection of the line so as to transmit the second transmission block.

22. An apparatus according to claim 21, wherein the set speed is a maximum communication speed between said apparatus and the destination station, so that said control means transmits the second transmission block successively after the first transmission block without disconnecting the line if the communication speed discriminated by said discrimination means is the maximum communication speed between said apparatus and the destination station, and disconnects the line if the discriminated communication speed is not the maximum communication speed between said apparatus and the destination station.

23. An apparatus according to claim 21, further comprising operating means for manually setting the set speed at a communication speed value, so that said control means transmits the second transmission block successively after the first transmission block without disconnecting the line if the communication speed discriminated by said discrimination means is equal to or greater than the communication speed value set by a user with said operating means, and disconnects the line if the discriminated communication speed is less than the communication speed value set by the user with said operating means.

24. An apparatus according to claim 21, wherein said control means disconnects the line after transmission of the first transmission block if there is no stored second transmission block having the same destination station as the first transmission block.

* * * * *

UNITED STATES PATENT AND TRADEMARK OFFICE
CERTIFICATE OF CORRECTION

PATENT NO. : 5,673,033

DATED : September 10, 1997

INVENTOR(S): MOTOALI YOSHINO

It is certified that error appears in the above-identified patent and that said Letters Patent is hereby corrected as shown below:

COLUMN 5

Line 1, "disconnected," should read --disconnected;--.

COLUMN 8

Line 38, "with in" should read --in an--.

Signed and Sealed this

Second Day of June, 1998

Attest:

BRUCE LEHMAN

Attesting Officer   Commissioner of Patents and Trademarks